United States Patent
Hugo et al.

[11] Patent Number: 6,101,212
[45] Date of Patent: Aug. 8, 2000

[54] SEALED EVACUATABLE CRUCIBLE FOR INDUCTIVE MELTING OR SUPERHEATING

[75] Inventors: Franz Hugo, Aschaffenburg; Thomas Ruppel, Soden-Salmünster; Hans-Günther Fellmann, Obertshausen, all of Germany

[73] Assignee: Ald Vacuum Technologies AG, Germany

[21] Appl. No.: 09/228,568

[22] Filed: Jan. 12, 1999

[30] Foreign Application Priority Data

Jan. 13, 1998 [DE] Germany .......................... 198 00 853

[51] Int. Cl.⁷ ...................................... H05B 6/22
[52] U.S. Cl. .................. 373/156; 373/140; 373/142; 373/7
[58] Field of Search .................... 373/138, 139, 373/140, 141, 151, 152, 155, 156, 158, 7, 78, 142

[56] References Cited

U.S. PATENT DOCUMENTS

| | | | |
|---|---|---|---|
| 2,825,641 | 3/1958 | Beall | 75/10 |
| 3,461,215 | 8/1969 | Reboux | 13/27 |
| 3,998,264 | 12/1976 | Hocking | 164/51 |
| 4,562,943 | 1/1986 | Freytag et al. | 373/142 |
| 4,816,228 | 3/1989 | Yoshida et al. | 422/159 |
| 5,121,406 | 6/1992 | Hugo et al. | 373/142 |
| 5,416,793 | 5/1995 | Hugo et al. | 373/142 |
| 5,872,352 | 2/1999 | Suganuma et al. | 219/646 |
| 5,892,790 | 4/1999 | Abiko et al. | 373/158 |
| 5,901,169 | 5/1999 | Kobayashi | 373/142 |
| 5,991,328 | 11/1999 | Choudhury et al. | 373/156 |

FOREIGN PATENT DOCUMENTS

| | | |
|---|---|---|
| 0276544 | 8/1988 | European Pat. Off. . |
| 518499 | 1/1931 | Germany . |
| 527452 | 6/1931 | Germany . |
| 1946735 | 9/1970 | Germany . |
| 3446260 | 7/1986 | Germany . |
| 4228402 | 3/1994 | Germany . |
| 295 02 809 U | 5/1995 | Germany . |
| 19610613 | 9/1997 | Germany . |
| 2223969 | 4/1990 | United Kingdom . |
| 2270966 | 3/1994 | United Kingdom . |

*Primary Examiner*—Tu Ba Hoang
*Attorney, Agent, or Firm*—Smith, Gambrell & Russell, LLP

[57] ABSTRACT

A sealed evacuatable crucible (1) for inductive melting of metals or other electrically conductive materials, including a plurality of palisades (2,2', ... ) which are arranged parallel to one another, and for enclosing the melt and forming the crucible wall, and having a crucible base part (3) which carries the palisades (2,2', ... ), and having an induction coil (18) which is wound around the palisades (2,2', ... ) from outside in direct manner distanced therefrom, and through which there flows an alternating current and which is movable in a vertical direction relative to the crucible (1), and having in the crucible base part (3) a discharge opening (25) which is closable by means of a stopper rod (13), there is provided below the crucible base part (3) an evacuatable chamber (10) which is formed of two parts (11, 12,) for receiving a vessel (14) for collecting the molten charge, which is placed below the discharge opening (25), wherein the lower chamber part (12) rests on the transporting surface of a lift-truck (16) and is movable therefrom towards the upper chamber part (11).

8 Claims, 2 Drawing Sheets

SEALED EVACUATABLE CRUCIBLE FOR INDUCTIVE MELTING OR SUPERHEATING

INTRODUCTION AND BACKGROUND

The present invention relates to a sealed, evacuatable crucible for inductive melting or superheating of metals, alloys or other electrically conductive materials, having a plurality of palisades which are arranged vertically and parallel to one another and distributed on an arc of a circle and distanced from one another, which enclose the melt and form the crucible wall, and having a base part which forms the base of the crucible and carries the palisades, wherein the palisades are provided at least in part with voids through which there flows a cooling medium, and having an induction coil which is wound round the palisades from outside in direct manner distanced therefrom, and through which there flows an alternating current.

There is known a process for melting difficultly meltable metals, in particular tantalum, tungsten, thorium or alloys thereof, in a water-cooled vessel (DE 518 499), wherein the vessel is made of substances having a melting point lower than that of the charge material, for example of quartz glass, copper or silver, and the energy necessary for melting is supplied and the vessel cooled such that the charge material is melted-down in residue-free manner without impurities arising from the crucible material. The actual crucible is heatable with the aid of an induction coil, wherein a circulating crucible current is prevented by the composition thereof from individual segments which are separated from one another by an isolation layer, for example of mica.

There is also known a high-frequency induction crucible formed of a plurality of palisades which are all arranged in a vertical manner on a disk-shaped base plate together forming a hollow cylinder (U.S. Pat. No. 3,461,215). Cooling water flows through all the current-conducting and heat-conducting palisades around which there is wound an induction coil. The base plate of ceramic material is provided with a closure by way of which the melt may be removed. Strips of isolating material are inserted between the palisades.

There is furthermore also known a crucible for slag-free melting of high-purity reactive metals in a vacuum chamber (EP 0 276 544), in which cooling water flows through the palisades around which the induction coil is wound in uniting manner and which are bolted firmly to a disk-shaped base plate, wherein the tubular palisades on the one hand are separated from one another by slots and, on the other, are all connected with one another in electrically conductive manner by way of the base plate which is formed of metal.

There is also known a liquid-cooled crucible, the wall of which is formed by metal tubes having high electrical and thermal conductivity and which is arranged for melting the charge material in the high-frequency field of an induction coil (DE-OS 1 946 735). The crucible wall consists of tube sections arranged parallel and adjacent to one another, some of which have parts which re-enter the interior of the crucible and form the crucible base. The distance dimensioned between the tubes is so small that the molten charge material cannot pass through the crucible wall. The crucible base has an opening which is delimited by the tube end sections which form the crucible base and is so narrow that solid charge material cannot pass through, and that a centering ring surrounds the opening. The actual crucible is encompassed by a quartz tube, the lower end of which is closed by a bottom plate and the upper end by a platform in the region of the crucible opening, wherein there is provided a further chamber with which the charge opening of the crucible is closable. Below the opening in the crucible base there is provided a vessel which serves to receive the molten charge.

There is furthermore known an induction melting apparatus for the melting of high-melting reactive metals, which is sealed to the atmosphere, and has a connection to connect it to a source of negative pressure or an inert gas source (DE-OS 42 28 402). This apparatus has an unlined melting crucible of metal around which there is wound an induction source, and a casting mould arranged below the melting crucible below an outlet. The melting crucible has a lid which hermetically closes the latter and a downwardly directed jacket-form extension in which the casting mould is arranged in sealing relationship to the internal jacket surface of the extension.

There is known, finally, a process for melting refractory metals such as, for example, titanium or zirconium (U.S. Pat. No. 2,825,641), in which the water-cooled crucible is provided on the base part thereof with a discharge opening which is closable with the aid of a cooled stopper rod, for which purpose the stopper rod is positioned in the wall of a chamber arranged below the crucible and is activatable externally by means of a handle.

An object of the present invention is to provide a crucible of the type under consideration, which suffices without isolating slag material, in which energy losses reduced, and non-productive times necessitated by carrying out the melting and casting operation are as short as possible.

SUMMARY OF THE INVENTION

The above and other objects of the present invention can be achieved according to the invention by an opening in the crucible base part, which is closable by means of a stopper rod, and with an evacuatable chamber which is provided below the crucible base part and connected thereto in pressure-proof manner and formed of two parts, for receiving a vessel for catching the molten charge, which is placed below the discharge opening, and with a liner of highly refractory material, which forms the discharge opening in the crucible base part, and an arm for holding and guiding the stopper rod, which is positioned movably on the upper chamber part.

BRIEF DESCRIPTION OF DRAWINGS

The present invention is amenable to a very wide variety of possible embodiments; one of which is illustrated in greater detail in schematic fashion in the appended drawings, wherein.

DETAILED DESCRIPTION OF INVENTION

Figure 1:
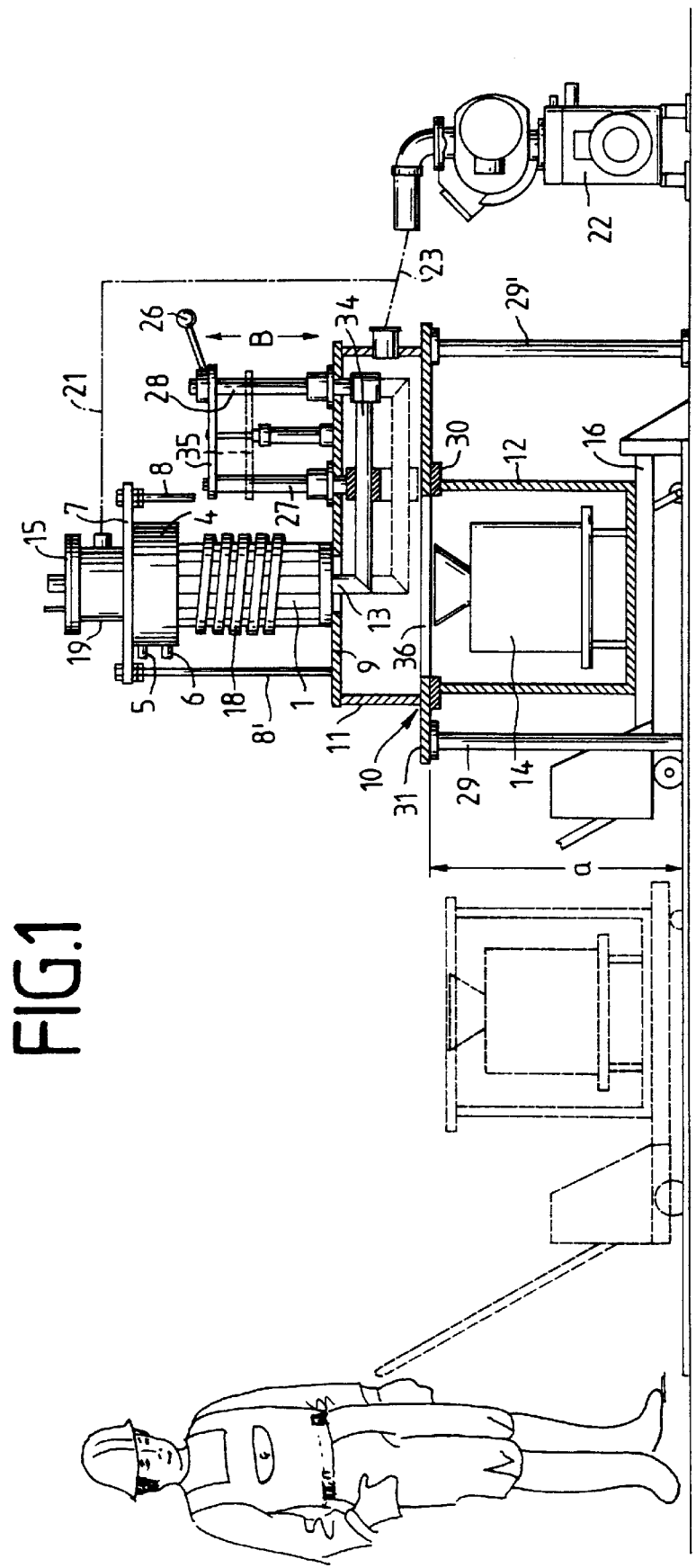
FIG. 1 is a side elevational view of an apparatus according to the invention, including the crucible having an induction coil and upper closure part having a collar, a lower two-part chamber having arranged in the upper part thereof the stopper rod and arranged in the lower part a vessel to receive the molten charge, a vacuum pump in position, an electrical control box and a transport truck having a liftable stage for the lower part of the two-part chamber, which is supported on the latter stage.
Figure 2:
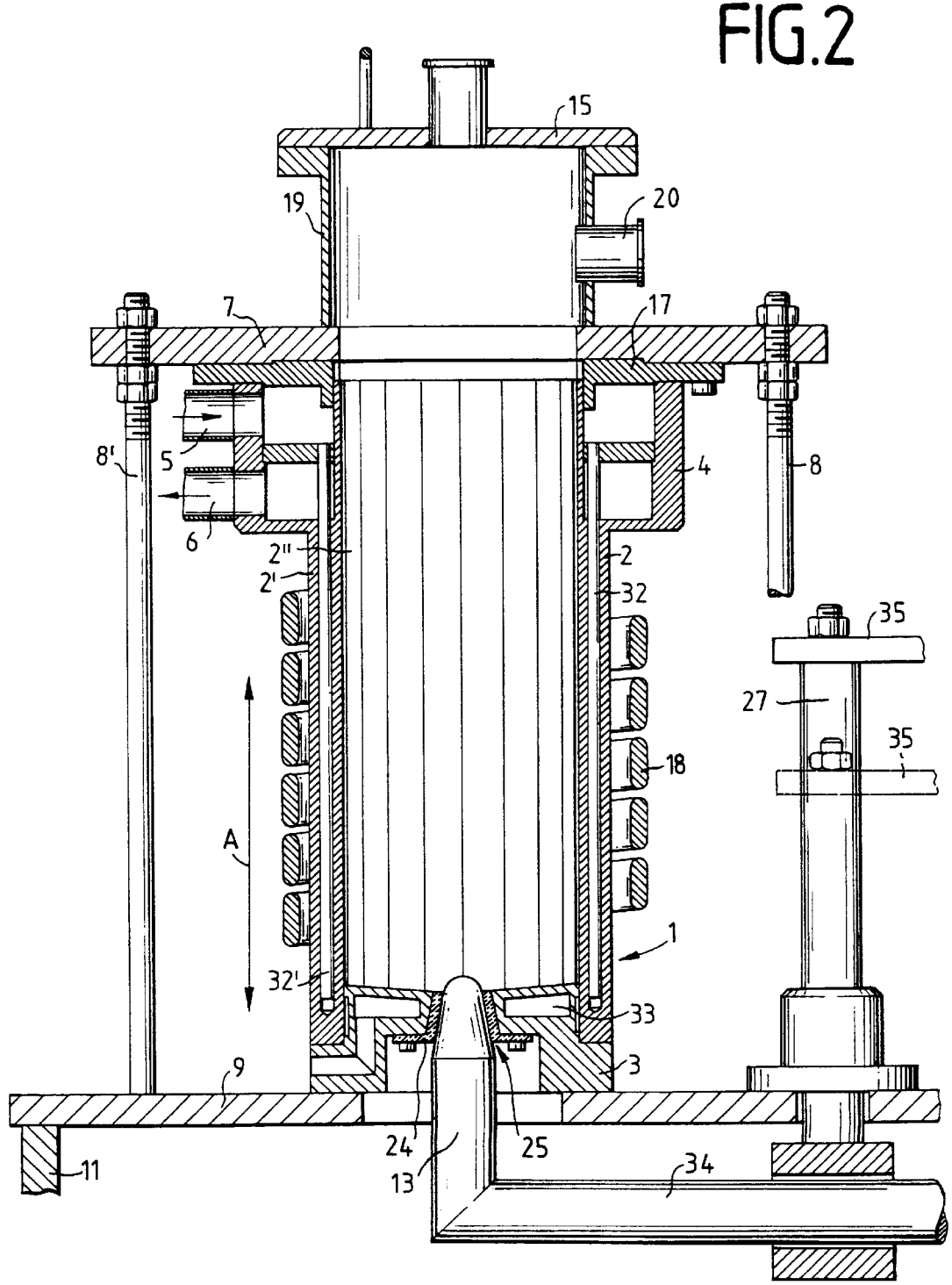
FIG. 2 is an enlarged partial sectional view through the water-cooled crucible of the apparatus according to FIG. 1.

The apparatus illustrated in FIGS. 1 and 2 substantially consists of a plurality of palisades 2,2', . . . supported on a crucible base part 3, which together form a hollow cylindrical crucible 1, a crucible head part 4 having the connections 5, 6 for a cooling medium, a head plate 7 which, with the aid of tie bolts 8, 81, draws the palisades 2,2', . . . towards a crucible base plate 9, which forms simultaneously the upper wall part of a second chamber 10 which consists of an upper part 11 and a lower part 12. In the upper part 11 of the chamber 10 there is positioned a stopper rod 13, and the lower potshaped part 12 encloses a vessel 14 for receiving the molten charge. The lower part 12 is supported on a movable stand 16. A lid part 15 having a collar 19 upwardly closes the crucible 1.

The palisades 2,2', . . . which stand with their lower ends on the crucible base part 3 and are centered with their upper ends by a ring 17, are enclosed by a distanced induction coil 18 which is held displaceably in the direction of the arrow A (that is to say in a direction longitudinal to the axis of rotation of the crucible) by a device which is not illustrated in greater detail.

The lid part 15 is set upon a collar 19 which is connected in fixed manner to the head plate 7, and closes the charge opening for the batch to be treated. The collar 19 has furthermore a connection piece 20 which is connected by way of a suction line 21 to the vacuum pump 22 which is moreover also connected by way of a second suction line 23 to the two-part chamber 10.

There is inserted into the crucible base part 3 a liner 24 of highly refractory material (preferably of graphite), whereof the central opening 25 forms the discharge for the molten material and is closable by the stopper rod 13. Cooling channels 33 additionally pass through the crucible base part 3.

The stopper rod 13 is displaceable in the direction of the arrow B by means of the handpiece 26, being for the latter purpose in operative connection with two guidance rods 27, 28 which are passed through the chamber lid 9.

The two-part chamber 10 is held on the base with the aid of supports 29, 29', . . . , wherein the distance "a" between the upper chamber part 11 and the base surface is dimensioned such that the lower chamber part 12 which is placed on the lift-truck 16 can be moved into the position represented by a broken line. There is located between the upper rim part 30 of the lower chamber part 12 and the intermediate flange 31 a seal, not illustrated in greater detail, which ensures that the sealed chamber 10 for the melting process can be pumped out, thus enabling the melt discharged from the opening 25 to flow into the vessel 14 and to be separated or removed from the actual apparatus after the melting operation or after the flooding of the chamber 10 and after lowering of the platform of the lift-truck 16.

The modular construction of the apparatus is fundamental to the invention: the slotted, cold crucible 1 is arranged as a self-contained unit on the chamber lid 9 in fixed manner by means of tie bolts 8,8', . . . , wherein the chamber lid 9 forms the upper wall of a chamber 11 which is open downwardly and stands in fixed manner on the base surface with legs or supports 29,29', . . . There is provided as a third section of the apparatus the lift-truck 16 on the platform whereof the lower chamber part 12 having the vessel 14 arranged therein is placeable, wherein the lift-truck 16 together with the lower chamber part 12 is movable to below the upper chamber part 11 and can be raised so as to create a pressure-proof connection between the two halves 11, 12 of the chamber 10.

Further variations and modifications of the foregoing will be apparent to those skilled in the art and are intended to be encompassed by the claims appended hereto.

German priority application 198 00 853.8 is relied on and incorporated herein by reference.

We claim:

1. A sealed evacuatable crucible for inductive melting or superheating of electrically conductive materials, comprising a plurality of palisades which are arranged vertically and parallel to one another and distributed on an arc of a circle and distanced from one another, and for enclosing a melt to form the crucible wall, having a disk-shaped crucible base part which carries the said palisades wherein the palisades are provided at least in part with voids through which a cooling medium flows, and having an induction coil which is wound around the palisades from outside in direct manner distanced therefrom, and through which there flows an alternating current and which is movable in a vertical direction relative to the crucible and having in the crucible base part a discharge opening which is closable by means of a stopper rod, and having, provided below the crucible base part and connected in pressure-proof manner therewith, an evacuatable chamber which is formed of an upper chamber part and a lower chamber part for receiving a vessel for collecting the molten charge, which is placed below the discharge opening, and having an arm for holding and guiding the stopper rod, which is positioned movably on the upper chamber part.

2. The apparatus according to claim 1, further comprising a liner of highly refractory material for insertion in the crucible base part, a longitudinal bore in said base part forming a discharge opening.

3. The apparatus according to claim 1, wherein said stopper rod extends in vertical manner and is coupled with a connecting rod which extends at approximately a right angle thereto, which is guided through an eye of a first guidance rod which is displaceable vertically in a chamber lid, wherein the free end of the connecting rod is in operative connection with a second guidance rod which is parallel to the first and is positioned displaceably in the chamber lid and is movable by way of a handpiece, wherein the two guidance rods which are parallel to one another are coupled to one another by way of a bridge.

4. The apparatus according to claim 1, wherein the upper chamber part is provided with a plurality of supports which hold the upper part at a predetermined distance from a base surface, wherein the underside of the upper chamber part is provided with an intermediate flange which has an aperture and which corresponds with an upper opening of the lower chamber part, wherein a rim part of the aperture forms a sealing surface.

5. The apparatus according to claim 1, wherein the lower chamber part rests on a transporting surface of a lift-truck, wherein the distance between a base surface and an intermediate flange of the upper chamber part is dimensioned larger than the distance between the base surface and a continuous upper edge of the lower chamber part when the transporting surface of the lift-truck is lowered.

6. The apparatus according to claim 1, wherein said material is a metal.

7. The apparatus according to claim 1, wherein said material is an alloy.

8. The apparatus according to claim 1, wherein said material is a nonmetallic electrically-conductive material.

* * * * *